APPARATUS FOR ENABLING A CONTINUOUS MAGNETIC TAPE OR SOME OTHER SUPPORT IN THE FORM OF A CONTINUOUS BAND TO BE REGULARLY DRIVEN INSIDE A MAGAZINE CHARGER

Filed Sept. 15, 1955 3 Sheets-Sheet 1

INVENTORS
Didier Appert
Serge Calliot
By Holcombe, Wetherill & Brisebois
ATTORNEYS INVENTORS
Didier Appert
Serge Cailliot
By Holcomb, Wetherill & Brisebois
ATTORNEYS Dec. 22, 1959 D. APPERT ET AL 2,918,536

APPARATUS FOR ENABLING A CONTINUOUS MAGNETIC TAPE OR SOME OTHER SUPPORT IN THE FORM OF A CONTINUOUS BAND TO BE REGULARLY DRIVEN INSIDE A MAGAZINE CHARGER

Filed Sept. 15, 1955 3 Sheets-Sheet 3

INVENTORS
Didier Appert
Serge Cailliot
By Holcombe, Wetherill & Brisebois
ATTORNEYS United States Patent Office 2,918,536

Patented Dec. 22, 1959

2,918,536

APPARATUS FOR ENABLING A CONTINUOUS MAGNETIC TAPE OR SOME OTHER SUPPORT IN THE FORM OF A CONTINUOUS BAND TO BE REGULARLY DRIVEN INSIDE A MAGAZINE CHARGER

Didier Appert and Serge Cailliot, Paris, France

Application September 15, 1955, Serial No. 534,555

Claims priority, application France September 18, 1954

8 Claims. (Cl. 179—100.2)

The present invention relates to improvements in apparatus for driving and reproducing a support in the form of a continuous band, such as a magnetic tape, for the purpose of enabling this support, on which (sound and/or image) information is recorded, to be kept protected from any handling during its storage and reproduction.

The present invention has more particularly as an object the new industrial product constituted by a substantially hermetically closed case or magazine charger intended to contain a continuous magnetic tape or some other information support or carrier having the form of a continuous band (for example a film containing recordings of images and/or sounds), said magazine charger ensuring, when placed on a normal record player turn-table, the perfectly regular unwinding of the magnetic tape or other support in front of a (for example magnetic) reproducing head previously introduced into the magazine charger through an aperture provided in the latter.

Apparatus has hitherto been brought into being for continuously driving and supporting an endless film, particularly for the purpose of continuously passing such a film through a working apparatus constituted by a cinematographic projector and/or a sound reproducer for the purpose of reproducing the images and/or the sound of the track recorded on this film, for example for advertising purposes.

On the other hand, an apparatus has not been accomplished, to applicants' knowledge, for continuously driving a magnetic tape (or some other band carrying a recording), which takes the form of a case or magazine charger which is substantially hermetically closed and from which the magnetic tape (or other band) is not removed and which it does not leave during its reproduction.

It is in fact known that in the case of cinematographic films these must necessarily leave the continuous driving apparatus to pass through the projector. On the other hand, it is known that the commercial exploitation of sound recordings and occasionally image recordings, on magnetic tapes will only be capable of practical realisation if they are kept protected from the handling of users, which handling in the long run entails the risk of damaging the support and the recording. It is particularly advantageous to keep the magnetic tape in a closed case when recordings are hired out, thus considerably increasing the length of service of the support.

That is why the present invention aims at achieving an apparatus constituting a magazine charger in which the magnetic tape is kept and in which it is sufficient merely to introduce a magnetic head through an aperture provided in said magazine charger, the magnetic tape never having to be taken out of said charger even for the purpose of passing it continuously in front of the magnetic head.

In short, the invention relates to a method of exploiting magnetic tapes and similar continuous supports, without their having to leave the device ensuring their storage and continuous regular driving, this device constituting a magazine charger.

In the preferred embodiment of the invention, the magazine charger has the form of a cylindrical case and comprises essentially a lower plate intended to be rotated by the turn-table of an ordinary record player, a middle part comprising essentially an annular tray limited by a flat base and by two coaxial cylindrical edges perpendicular to this base, and a lid resting on the middle part, the magnetic film being disposed inside the tray covered by the lid.

The charge further comprises a series of arbors or cylindrical or conical rollers disposed radially between the two cylindrical edges of the middle part and spaced regularly on the periphery of the annular tray, each of said arbors being driven in rotation by means of a roller which is solid with it and which is in contact with the aforesaid plate, a drum driven in rotation by the plate and ensuring the driving of the magnetic tape which surrounds it over a large part of its periphery, and a series of rollers for guiding the continuous magnetic tape which rests on the aforesaid arbors.

In the lid of the magazine charger is provided an aperture intended to receive the magnetic head of the reproducer or a sleeve carrying a magnetic head, this sleeve being connected to a wireless receiver or to an amplifier followed by a loudspeaker.

By way of illustration of the possibilities for carrying the invention into effect, and without any limiting character of the scope of the invention, two embodiments will now be described as examples, and will show other features of the invention. The description is made with reference to the accompanying diagrammatic drawing, in which.

In the drawing, the elements not forming part of the magazine charger according to the invention are shown in broken lines. In the two embodiments shown, like reference numbers indicate elements playing the same part.

Figures 1, 2:
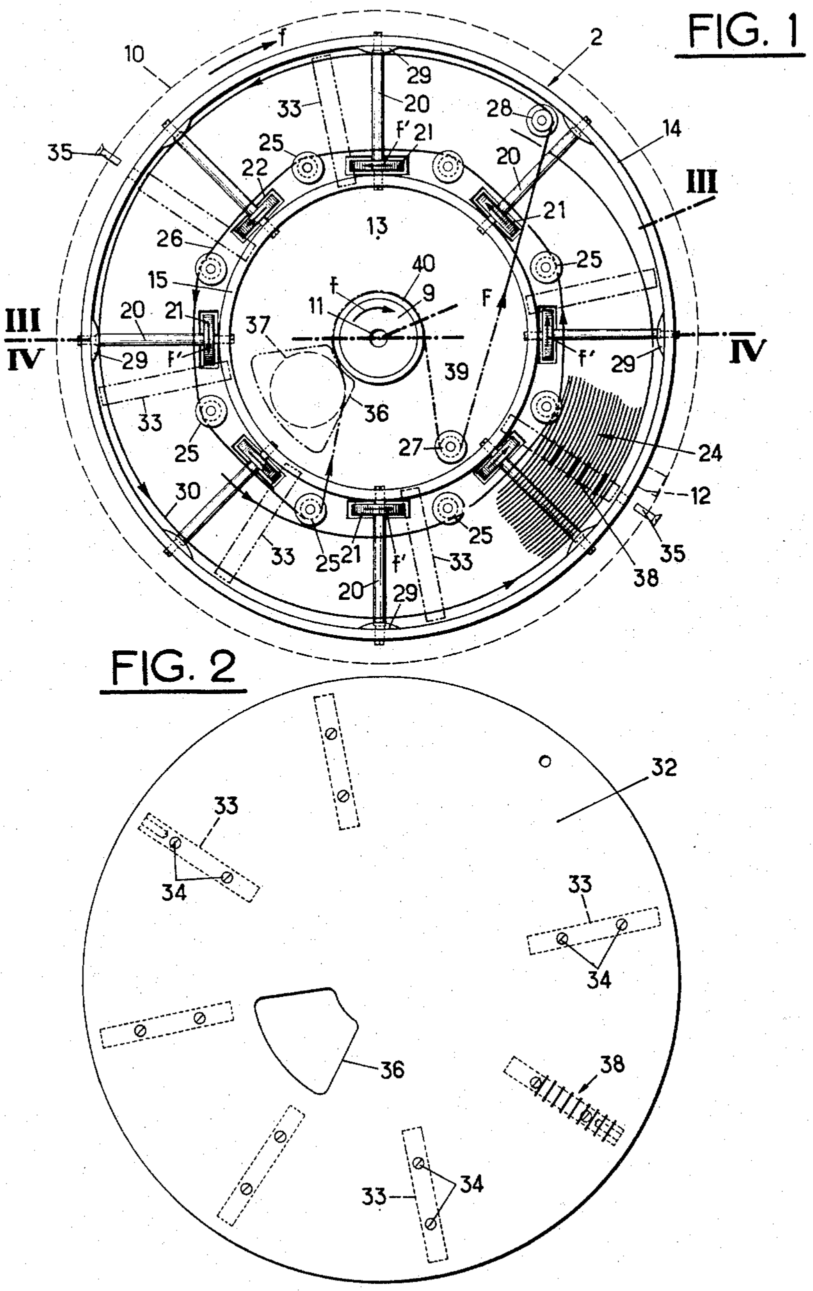
Figure 1 is a plan view (from above) of a magazine charger according to the invention containing a continuous magnetic tape and disposed on the turn-table of a conventional record player.
Figure 2 shows the lid of the magazine charger in Figure 1.
Figure 3:
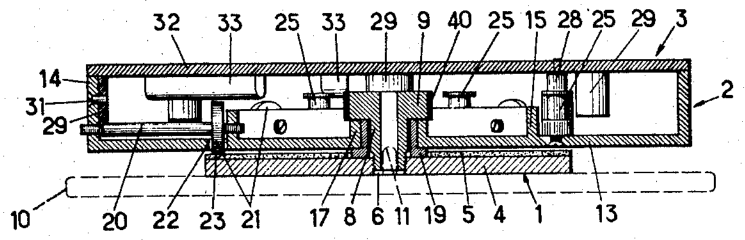
Figure 3 is a section through III—III in Figure 1, assuming the magnetic tape to be removed.
Figure 4:
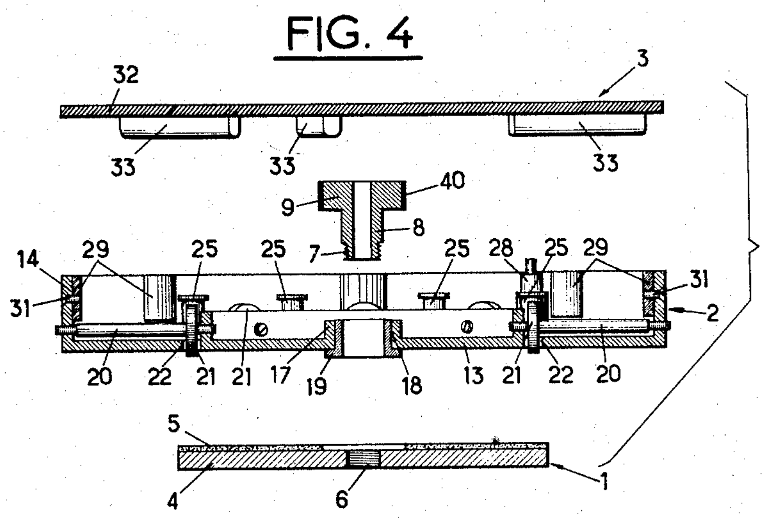
Figure 4 is an exploded view of the different elements of the magazine charger (without the magnetic tape), in section on IV—IV in Figure 1.
Figure 5:
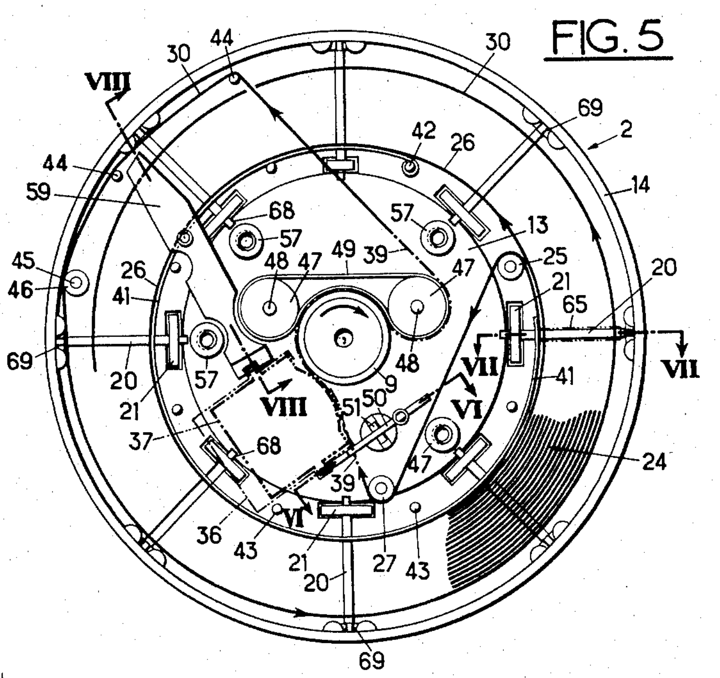
Figure 5 is a plan view of a magazine charger similar to that in Figure 1, with the lid removed, this charger containing various improvements.

The magazine charger shown in Figures 1 to 4 comprises essentially three parts, namely a plate 1, a middle part 2, and a lid 3.

The turn-plate 1, constituted by a plate 4 covered with a layer of felt 5, contains a central tapped hole 6, in which is screwed the threaded end 7 of the arbor 8 of a drum 9. The plate 1 rests on the turn-table 10 (bearing the conventional short centring rod 11) of a conventional record player which rotates it with the drum 9 in the direction indicated by the arrow *f* (conventional direction of rotation of a record player) when the turn-table 10 rotates in the same direction *f*.

On the other hand, the central part, or annular tray 2, with which the lid 3 is solid, is arrested in respect of rotation by a locking element 12. The turn-table 10 of the record player can, of course, be replaced by any wheel or plate bearing a centring rod and turning at the desired constant speed.

The annular tray 2 comprises essentially a base 13, a circular peripheral rim 14, and a circular member 15 forming an annular tray 16. In the centre of the part 2 is provided an internal rim 17 limiting a circular bore 18 in which is passed a sleeve 19 through which passes the arbor 8 of the drum 9.

A series of equidistant arbors or rollers 20 are disposed radially in the annular tray 16. These rollers, which may be cylindrical or conical (in the latter case the smallest diameter of the rollers is situated at the external periphery of the tray), can roll freely in small bearings (not illustrated) carried by the edge 14 and the member 15.

A roller 21 passing through an aperture 22 provided in the base 13 is solid with each roller 20. The lower generatrixes 23 of the rollers 21 are in constant contact with the felt 5 of the plate 1 under the action of gravity, the annular tray 2 resting on this plate 1 by the rollers 21. Rotation of the plate 1 consequently has the effect of turning, in the direction of the arrows *f*, the rollers 21 and hence the arbors 20 on which rests the disc 24 formed by the magnetic tape (shown only partially in the drawing) thus ensuring the rotation of the latter as will be indicated hereinbelow.

Vertical rollers 25 for guiding the first turn 26 of the disc 24 to be reproduced are disposed regularly near the member 15 and can turn freely about their vertical axes when the turn 26 is driven by the drum 9. Vertical return rollers 27 and 28 are also provided.

Elongated bulges may also be provided having in section the shape of a segment of a circle in order to prevent the last turn 30 of the disc 24 from rubbing against the surface of the rim 14, this turn being in contact if necessary only with the round-off of the bulges 29. These bulges 29 may form an integral part of the part 2 (when the latter is a moulding), or be fixed to said part 2 by screws 31.

The lid 3, constituted by a plate 32, is screwed on the part 2 once the magnetic tape is in place. The plate 32 carries small bars 33 fixed below its lower face by screws 34. Said bars 33 serve to prevent the turns of the disc 24 from rising, thus preventing any undesired displacement of the turns, which would cause drawbacks. Screws 35 pass through the edge 14 of the part 2 and penetrate into the bars 33, thus ensuring the securing of the lid 3 on the annular tray 2.

In the lid 3 is provided an aperture 36 enabling a magnetic head 37 to be introduced, or a sleeve containing a magnetic head, and a device ensuring the raising or lowering of the reproducing head when several tracks recorded on the magnetic tape 24 have to be reproduced successively.

On one of the bars 33 is disposed a graduated scale 38 which, in cooperation with a leader 39 (shown in mixed lines) of a colour different from the rest of the magnetic tape (as will be explained below), enables the passage of the recording reproduced by the magnetic head 37 to be noted.

The operation of the magazine charger described above is as follows:

A reel 24 of magnetic tape is first disposed in the tray 16 of the magazine charger (after the lid 3 has been removed). The tape rests by its edge on the rollers 20, the beginning of the recording (turn 26 and leader 39) being disposed in the centre of the reel 24 and the end of the recording (turn 30) at the outside. On the one hand the turn 26 and the leader 39 are disposed on the drum 9 and the guide rollers 25 and 27 and on the other hand the turn 30 is disposed on the guide roller 28, as shown in Figure 1. The beginning of the leader 39 and the end of the magnetic tape (end of the turn 30) are then welded. The charger then has the exact appearance shown in Figure 1. The sleeve containing the magnetic head 37 is then introduced into the recess 36 and it is sufficient to place the assembly formed by the magazine charger and the sleeve on the turn-table 10 of a conventional record player, the arresting device 12 locking the part 2 in respect of rotation.

When the record player is switched on, the motor thereof rotates the turn-table 10 in the direction of the arrow *f*. This rotation of the turn-table 10 has the effect of driving the drum 9 in the direction of the arrow *f*, and the rollers 21 and the rollers 20 solid with them in the direction of the arrows *f'*. The drum 9 drives the part of the magnetic tape which is in contact with it (a roll of rubber 40 may advantageously be provided round the drum 9 to improve the driving of the magnetic tape).

The drum 9 first drives the leader 39, then the first turn 26 and finally the other turns of the reel 24, the recording being reproduced by the magnetic head 37 as the tape passes before this head. In the drawing the arrow *f* illustrates the direction of advance of the magnetic tape.

The greater part of the magnetic tape constituting the reel 34 rests by its edge on the rollers 20 which turn in the direction of the arrows *f'*, thus ensuring a regular rotation of the reel as the tape is driven by the drum 9.

The ratio of the diameter of the rollers 21 to the diameter of the rollers 20 (in the case in which the latter are cylindrical) and the diameter of the drum 9 are calculated in order that the total passage of the magnetic tape may be perfectly linear and smooth and take place without any intense traction on the magnetic tape (such a traction would result in breakage of the tape). Moreover, the aforesaid diameters are calculated so as to avoid too great a force being required from the motor of the record player, which motor is generally of low power.

For the purpose of preventing the turns from rubbing against one another during their driving, it is advantageous to provide a certain spacing between the turns (a certain "slack" between the turns), thus permitting the free displacement of the turns in relation to one another.

As the recording is reproduced, the leader 39, the beginning of which first passes over the roller 28, then moves from the periphery towards the interior to reach the internal edge of the reel and at the end of the reproduction of the recording will occupy the position shown in Figure 1.

One of the small bars 34 is provided with a graduated scale 38, the position of the leader 39 (which has, for example, a different colour from the rest of the magnetic tape) in relation to the scale 38 enabling the passing of the "piece" of the recording reproduced to be noted. When, for example, the magnetic tape contains a recording of several pieces of music or several songs, the titles (and accompanying indications) regarding each of the pieces of music or of the songs can be shown opposite the graduated scale 38 or on a separate sheet. When the width of the magnetic tape constituting the reel 24 enables several parallel tracks to be recorded, it is, of course, possible to record several tracks (four for example), the sleeve, which contains the magnetic head 37, having a device ensuring the rise or fall of the reproducing head 37 by a determined value (pressing from reproduction of one track to reproduction of another track). It is even possible to provide a leader which, when passing before the magnetic head, automatically brings about the rise or fall of the said head 37 by the height separating two tracks, thus ensuring the continuous reproduction of all the tracks recorded on the magnetic tape. Thus it is possible to have a recording of very long duration, for example several hours, in one magazine charger, reproduction of this recording recommencing once it is finished, this being very advantageous in the case of a programme having to be transmitted which is relatively varied but capable, if necessary, of being repeated after a certain number of hours (for example in ice-skating rinks).

In the embodiment shown in Figures 5 to 8, reference 2 again denotes a part in the form of a tray with a cylindrical edge 14 and a base 13; the part 2 serves as a magazine for a reel 24 formed by a tape bearing a recording and wound spirally with the turns close together, having an inner turn 26 and an outer turn 30 joined by an intermediate tape element or leader 39. References 25 and 27 designate the guide rollers having vertical arbors fixed on the base 13.

The intermediate element 39 of the tape is wound round a drum 9, the arbor of which is solid with a lower plate 1 (see Figures 6 and 7) in the form of a circular plate supported on a record player turn-table or the like, on which it is centred by an axial rod engaging in a corresponding axial opening. The drive of the reel 24 is effected by the rotation of rollers 20 which are in turn driven by the friction of their respective rollers 21 against the plate 1 (see Figures 5 and 7) when the latter is driven by the record player turn-table or like turn-table, the magazine constituted by the middle part 2 and its lid 3 (see Figures 6 to 8) being kept immovable by any suitable means. Chain-dotted lines show the position occupied by the aperture 36 reserved for the magnetic head 37 which is also shown in chain-dotted lines.

According to this second embodiment, a spring 41 is provided which is constituted by an elastic strip fixed by one of its ends to a rod 42 and having substantially the form of an interrupted circle, coaxial with the drum 9; the end of the spring 41 which is not fixed comes in proximity with the guide roller 25 from which the inner turn is deflected to be brought before the head 37. The spring strip 41 tends to open in the radial direction and bear against the inner turn 26, ensuring its regular tension and preventing this turn from forming angular folds as is the case when it is guided solely by regularly spaced rollers. Closing of the strip 41 in the radial direction under the locking action of the wound tape is limited by rods 43 fixed to the base 13.

Reference 44 denotes rods for guiding the outer turn 30, 45 a rod provided with a roller 46 for bringing the turn 30 in the middle plane of the reel 24. In the embodiment shown, the lid 3 is fixed by means of screws engaging in tapped bushes 57 forming an integral part of the base 13.

Another advantageous feature of the invention consists in providing two small pulleys 47 mounted on arbors 48 perpendicular to the base 13 and solid with this base; on said pulleys, which may be slightly convex, is mounted a rubber belt 49 which locks the tape in respect of unwinding against the drum 9, thus ensuring good adhesion and preventing the slipping of the tape when it passes below the head 37. The two devices just described greatly improve the quality of reproduction while ensuring unwinding at regular speed and without vibration of the tape in front of the head 37; regulation of the slack on starting can be easily effected since it is not necessary to be precise, an automatic adjustment of the distribution of the slack taking place automatically by the action of the spring 41.

This second embodiment contains another improvement constituted by a locking device for the plate 1, this device comprising a pawl 50 (Figures 5 and 6) rocking about an arbor 51 carried by the base 13 by an appropriate small cast stirrup. A spring 52, supported in a recess in the lid 3, tends to rock the pawl 50 so that its snout 53 enters a corresponding recess in the plate 1, it also being possible for this plate to have several identical recesses distributed over its periphery; in the position shown in solid lines, the snout 53 prevents any relative movement of the base 13 in relation to the plate 1: the reel 24 is thus unable to turn. The head 37 has a stud 54 which can pass inside a groove 58 in the lid 3 when the head 37 is put into position; during this insertion the head 37 is then pushed in the direction of the arrow *g* so that it occupies the position shown in broken lines, the stud 54 slides against a ramp 55 carried by the lid and comes to bear on the snout 56 of the pawl 50, which assumes the position shown in dashed lines thus disengaging the snout 53; at this instant the plate 1 can turn in relation to the base 13, i.e. effect the unwinding of the tape stored.

For the purpose of completely immobilising the reel 24 when the magazine charger is put in storage, a locking plate 59 can be provided (see Figure 8), said plate being mounted rockably on a support 60 solid with the base 13 and having a catch 61 on which can bear a stud 62 of the head 37 when the latter is put in position; said stud 62 is guided in a groove 58 similar to the preceding one and also slides against a ramp 55. A spring 63 mounted below the lid 3 pushes the plate 59 provided with a felt lining 64 against the reel 24 thus immobilsing the latter if the head 37 has not been inserted; on inserting said head for the purpose of putting it in the operating position, the plate 59 is raised and the freed reel 24 can be unwound.

Figures 6, 7, 8:
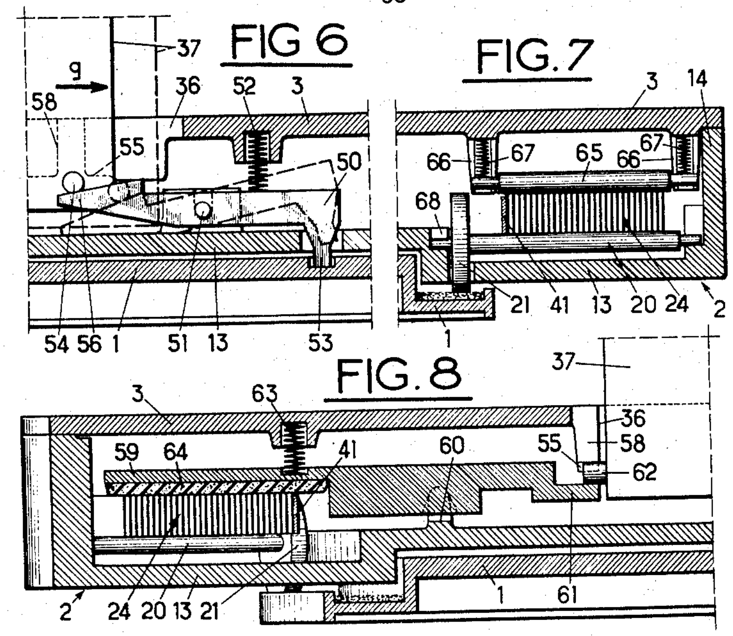
Figure 6 is a partial section on VI—VI in Figure 5, with the lid in position.
Figure 7 is a partial section on VII—VII in Figure 5, with the lid of the charger in position.
Figure 8 is a partial section on VIII—VIII in Figure 5, with the lid restored.

The device shown on a larger scale in Figure 7 has the object of improving the drive of the reel 24 by improving its adhesion on a driving roller 20; this device comprises an upper roller 65, the ends of which are engaged in two hollow supports 66 having a slot to enable the roller 65 to move perpendicularly to the lid 3, with which said supports 66 are solid. Two small springs 67 housed in the supports 66 push the roller 65 to make it bear against the upper face of the reel 24 which is in turn pushed against the roller 20 driving it.

The foregoing description shows that the magazine charger according to the invention enables a magnetic tape to be kept in a substantially hermetically closed case protected from any handling and deterioration even during playing; the small space requirements and the relatively low cost of this device facilitate the spreading of magnetic recording particularly through its application to the continuous transmission of music.

It is obvious that other improvements can be made by the specialist to the construction of the apparatus described; one of these improvements consists in using, as bearings for the ends of the rollers 20 (see Figure 7), simple grooves 68 and 69 provided respectively in the body of the base 13 (having a slight extra thickness) and in appropriate bosses in the edge 14. It is also within the scope of the technician to carry into effect an apparatus of the freewheel or pawl type in order that the plate 1 may turn in only one direction, which is generally the clockwise direction, looking at the top of the lid 3.

What we claim is:

1. Apparatus for continuously exposing successive portions of a spirally wound continuous strip to a cooperating head, said apparatus comprising a stationary annular tray provided with a central aperture, a coaxial rotatable base plate carrying a coaxial driving drum fixed thereto which projects upwardly through said central aperture, means for guiding said strip past said cooperating head and guiding a surface of said strip into frictional engagement with said drum as it passes between a position in the innermost and one in the outermost turn of said spiral, a plurality of radially disposed rollers rotatably mounted on said annular tray in a ring coaxial with said base plate and adapted to support said spirally wound strip, and a wheel fixed on each roller in driving engagement with said base so that rotation of said base turns both said rollers and said drum, thereby driving said strip.

2. Apparatus for continuously exposing successive portions of a spirally wound continuous strip to a cooperating head, said apparatus comprising a base adapted to rest on a rotatable turntable and turn therewith, an upwardly projecting shaft fixed to the center of said base and carrying a drum fixed thereto which is adapted to drivingly engage a surface of said strip, means for guiding said strip past said cooperating head and into frictional engagement with said drum as it passes between a position in the innermost turn of said spiral and one in the outermost turn, a reel holder provided with upwardly projecting flanges and a central orifice in which said shaft is journalled, said reel holder being adapted to be held stationary despite rotation of said shaft and base, a plurality of rollers disposed in a ring which is coaxial with said shaft and lies in a plane parallel to said base, the ends of said rollers benig journalled in said upwardly projecting flanges, and a wheel fixed on each roller with its periphery engaging said base so as to be driven by the rotation thereof, said rollers being positioned to support the edges of said spirally wound strip and assist said drum to urge it into rotation.

3. Apparatus as claimed in claim 2 in which the upper surface of said annular tray is enclosed by a peripheral rim on said tray and a cover apertured to admit a cooperating head but cooperating with said rim to prevent any other access to said spirally wound strip.

4. Apparatus as claimed in claim 2 wherein a strip spring of circular shape having one end fixed and the other free bears over its entire length against the inner turn of said spirally wound strip.

5. Apparatus as claimed in claim 1 comprising a pawl pivotally mounted on said base plate and biased toward said tray, cooperating abutment means on said tray positioned to be engaged by said pawl and thereby prevent relative movement between said base plate and tray, and means actuated by movement of said cooperating head into operating position for forcing said pawl away from said tray, thereby permitting relative motion between said tray and base plate.

6. Apparatus as claimed in claim 2 comprising means for locking said spirally wound strip to said annular tray when said head is not in operating position.

7. Apparatus as claimed in claim 6 wherein said locking means comprise a rocking plate bearing elastically on the upper edge of said spirally wound strip and movement of said head into operating position rocks said plate away from said strip.

8. Apparatus for continuously exposing successive portions of a spirally wound strip at a uniform speed to a cooperating head, said apparatus comprising a vertical central shaft, a driving plate fixed to one end of said shaft and adapted to rest on a rotatable turntable, an annular tray coaxially mounted on said shaft and adapted to be held stationary when said driving plate and shaft are rotated, a driving drum turned by said shaft, means for guiding said strip past said cooperating head and guiding a surface of said strip into frictional engagement with said drum as it passes between a position in the innermost and a position in the outermost turn of said spiral, a plurality of radially disposed rollers rotatably mounted on said annular tray in a ring coaxial with said shaft and in a plane parallel to said driving plate, said rollers being frictionally driven from the upper surface of said driving plate and adapted to support and drive said spirally wound strip when its edge is laid thereon, so that each rotation of said driving plate frictionally turns said rollers and turns said drum through said shaft thereby driving said tape by both its edge and surface through two independent power transmitting paths.

References Cited in the file of this patent

UNITED STATES PATENTS

| | | |
|---|---|---|
| 2,311,204 | Bouma | Feb. 16, 1943 |
| 2,398,639 | Heyer | Apr. 16, 1946 |
| 2,546,124 | Hart | Mar. 20, 1951 |
| 2,609,457 | Thurm | Sept. 2, 1952 |
| 2,658,955 | Carson | Nov. 10, 1953 |
| 2,778,637 | Eash | Jan. 22, 1957 |
| 2,778,880 | Eash | Jan. 22, 1957 |

FOREIGN PATENTS

| | | |
|---|---|---|
| 457,444 | Canada | June 21, 1949 |